US012100373B2

(12) United States Patent
Koizumi

(10) Patent No.: US 12,100,373 B2
(45) Date of Patent: Sep. 24, 2024

(54) SNARE DRUM STRAINER STRUCTURE

(71) Applicant: Pearl Musical Instrument Company, Yachiyo (JP)

(72) Inventor: Takashi Koizumi, Yachiyo (JP)

(73) Assignee: PEARL MUSICAL INSTRUMENT COMPANY, Chiba (JP)

( * ) Notice: Subject to any disclaimer, the term of this patent is extended or adjusted under 35 U.S.C. 154(b) by 248 days.

(21) Appl. No.: 17/964,090

(22) Filed: Oct. 12, 2022

(65) Prior Publication Data

US 2024/0127772 A1 Apr. 18, 2024

(51) Int. Cl.
*G10D 13/18* (2020.01)
*G10D 13/02* (2020.01)

(52) U.S. Cl.
CPC ............. *G10D 13/18* (2020.02); *G10D 13/02* (2013.01)

(58) Field of Classification Search
CPC ......... G10D 13/18; G10D 13/02; G10D 13/00
See application file for complete search history.

(56) References Cited

U.S. PATENT DOCUMENTS

| | | | |
|---|---|---|---|
| 5,107,742 A | 4/1992 | Cummings et al. | |
| 5,557,053 A | 9/1996 | Nickel | |
| 6,093,877 A | 7/2000 | Nickel | |
| 6,534,698 B2 | 3/2003 | Hoshino | |
| 7,439,433 B1 | 10/2008 | Hsieh | |
| 7,745,712 B2 | 6/2010 | Dunnett | |
| 8,017,846 B2 | 9/2011 | Miyajima | |
| 8,791,238 B2 | 7/2014 | Yu | |
| 9,697,810 B2 | 7/2017 | Momose et al. | |
| 9,990,908 B2 | 6/2018 | Badalament | |
| 10,692,477 B1 | 6/2020 | Wu | |
| 2006/0266198 A1 | 11/2006 | Jeffries et al. | |
| 2018/0025709 A1* | 1/2018 | Boone .................... | G10D 13/18 84/415 |

* cited by examiner

*Primary Examiner* — Kimberly R Lockett
(74) *Attorney, Agent, or Firm* — Manelli Selter PLLC; Edward Stemberger

(57) ABSTRACT

A strainer is provided for a snare drum having a bottom drumhead. The strainer includes a mounting bracket configured to be mounted to a side of a drum shell near the bottom drumhead. A slider is received in an opening in the mounting bracket for vertical movement with respect to the mounting bracket. The slider has an adjustment/tension knob including a threaded bolt. The mounting bracket has a portion configured to clamp on a portion of the slider. A key bolt structure is configured to releasably cause clamping of the mounting bracket against the slider. A post has a portion received in an internal opening of the slider threadedly engaged with the bolt. A snare carrier is fixed to the post. The snare carrier is configured to receive and carry an end of a snare wire assembly.

20 Claims, 8 Drawing Sheets

SNARE DRUM STRAINER STRUCTURE

FIELD

The present invention relates to snare drums in general and, more particularly, to a strainer structure for use with a marching snare drum, where the strainer structure includes a light-weight slider ON/OFF mechanism for connection to each side of the drum to facilitate vertical movement of the snare wires in a manner parallel to the bottom drumhead.

BACKGROUND

Snare drums typically include a plurality of wires, or snares, which contact a bottom drumhead or drumskin of the snare drum so that the wires are vibrated by the vibration of the bottom drumhead when the snare drum is played. A strainer is typically used to tension the wires in order to change the tone produced by the drum by changing the position of the wires so that they are either in contact or not in contact with the drumhead. Wire tension may also be fine-tuned or finely adjusted by a tension knob which is rotated to finely tune the tension in the wire to change the tone produced by the drum.

Conventional snare drums have a mechanism that works as ON/OFF switch that is essential for adjustment/tuning of the wires, although it is only used occasionally. Some conventional marching strainers include complex mechanisms such as links, cams or levers to facilitate the adjustment. However, such adjustment structures tend to often break down because of rough handling. Reinforcing these adjustment structures to prevent breakage will disadvantageously make the drum heavier. Light-weight marching snare drums are preferred.

Therefore, there is need for a novel, simple strainer structure with effective slider ON/OFF mechanisms that eliminates complexity such as the link/cams/lever adjustment structure, that has fewer parts, and thus reduces the total weight of drum.

SUMMARY

The present embodiment is directed to a strainer structure for a snare drum having a bottom drumhead. The strainer structure includes a first-side component including: a first mounting bracket configured to be mounted to one side of a drum shell near the bottom drumhead; a first slider received in an opening in the first mounting bracket for vertical movement with respect to the first mounting bracket, the first slider having a first adjustment/tension knob including a first threaded bolt, the first mounting bracket having a portion configured to clamp on a portion of the first slider; a first key bolt structure configured to releasably cause clamping of the first mounting bracket against the first slider; a first post having a portion received in an internal opening of the first slider and threadedly engaged with the first threaded bolt, and a first snare carrier fixed to the first post. A snare wire assembly is provided and includes a plurality of wires extending between first and second ends thereof. The first end being received in the first snare carrier. The strainer structure further includes a second-side component including: a second mounting bracket configured to be mounted to a side of the drum shell near the bottom drumhead at a location diametrically opposed to the first mounting bracket; a second slider received in an opening in the second mounting bracket for vertical movement with respect to the second mounting bracket, the second slider having a second adjustment/tension knob including a second threaded bolt, the second mounting bracket having a portion configured to clamp on a portion of the second slider; a second key bolt structure configured to releasably cause clamping of the second mounting bracket against the second slider; a second post having a portion received in an internal opening of the second slider and threadedly engaged with the second threaded bolt; and a second snare carrier fixed to the second post, the second end of the snare wire assembly being received in the second snare carrier.

When the first side component and the second side component are mounted to the drum shell and with the first and second key bolt structures causing the first and second mounting brackets to clamp on the respective first and second siders, each disposed in a snare ON position with the snare wires pressed against the bottom drumhead, each key bolt structure can be rotated to release clamping of the first and second mounting brackets on the respective first and second siders so that each slider can be manually moved downwardly causing the wires to move away from the bottom drumhead to a snare OFF position, whereby an entire length of the wires can be kept parallel with the bottom drumhead in the snare OFF position.

In accordance with another aspect of an embodiment, a strainer is provided for a snare drum having a bottom drumhead. The strainer includes a mounting bracket configured to be mounted to a side of a drum shell near the bottom drumhead. A slider is received in an opening in the mounting bracket for vertical movement with respect to the mounting bracket. The slider has an adjustment/tension knob including a threaded bolt. The mounting bracket has a portion configured to clamp on a portion of the slider. A key bolt structure is configured to releasably cause clamping of the mounting bracket against the slider. A post has a portion received in an internal opening of the slider threadedly engaged with the bolt. A snare carrier is fixed to the post. The snare carrier is configured to receive and carry an end of a snare wire assembly.

Of course, the invention should not be limited to the specific structure shown in the drawings or described herein. The structural and functional benefits of the present invention will be apparent to those of skill in the art when viewed in light of the following description and the accompanying drawings, which are not intended to limit the scope of the invention.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

DETAILED DESCRIPTION OF EXEMPLARY EMBODIMENTS

Reference will now be made in detail to exemplary embodiments and methods of the invention. It should be noted, however, that the invention in its broader aspects is not necessarily limited to the specific details, representative materials and methods, and illustrative examples shown and described in connection with the exemplary embodiments and methods.

Figure 1:
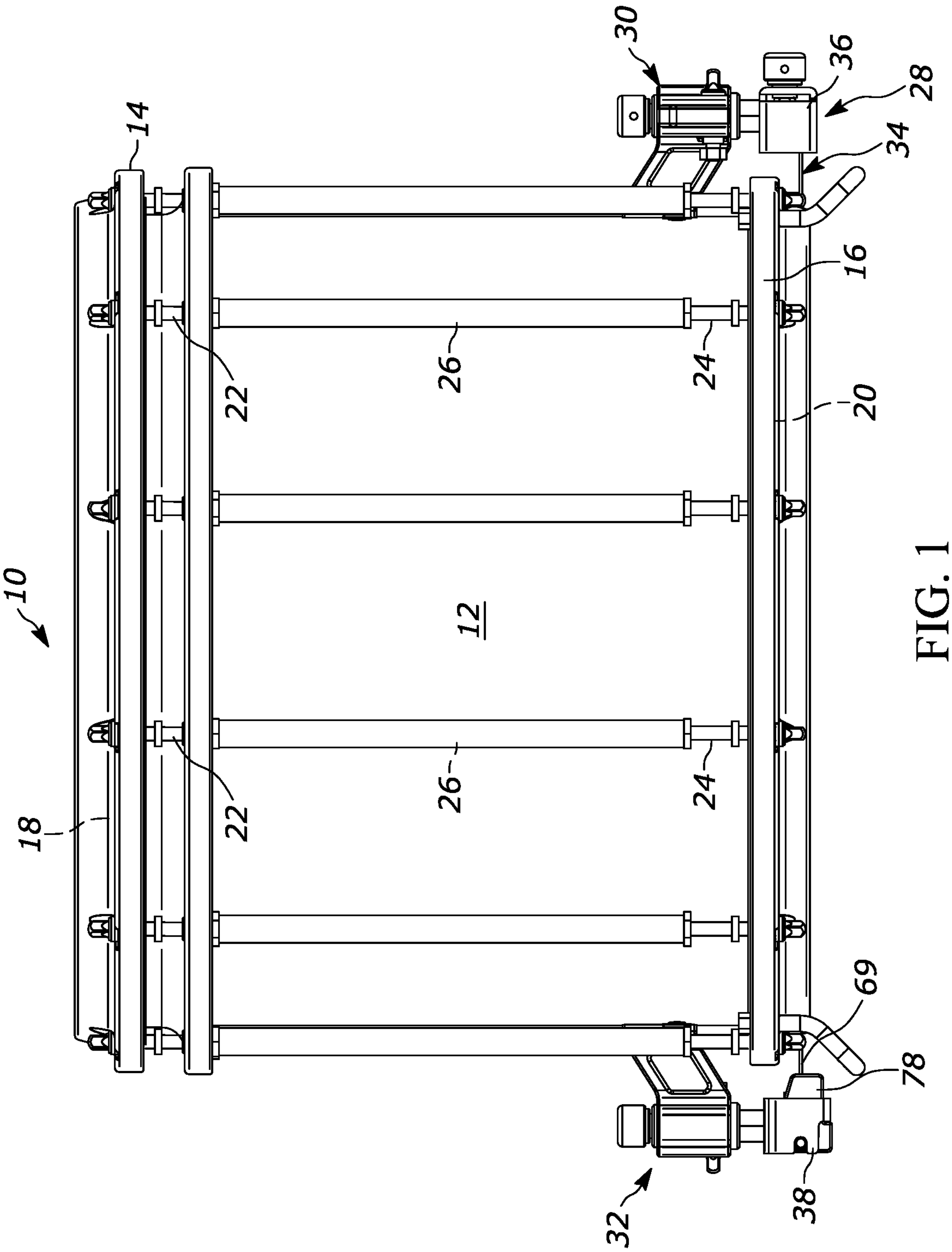
FIG. 1 is a side view of a snare drum shown with a strainer structure attached thereto in accordance with an embodiment.

FIG. 1 illustrates a snare drum 10 shown with a strainer structure 28 attached thereto according to an exemplary embodiment of the present disclosure. The drum 10 comprises a drum shell 12, an upper hoop 14, a lower hoop 16, an top drumhead 18 (not seen), a bottom drumhead 20 (FIG. 8), upper tensioning rods 22, lower tensioning rods 24, and tension posts 26 interconnecting the upper and lower tensioning rods 22, 24.

The strainer structure, shown generally indicated at 28, includes a first-side component 30 and a second-side component 32 fixed via fasteners 31 (FIG. 3) to the drum shell 12 at diametrically opposite sides of the drum shell 12 near the bottom drumhead 20. The strainer structure 28 is configured to carry a snare wire assembly 34 extending between two opposing snare carriers 36, 38 holding opposite ends of the snare wire assembly 34, as will be explained further below.

Figure 7:
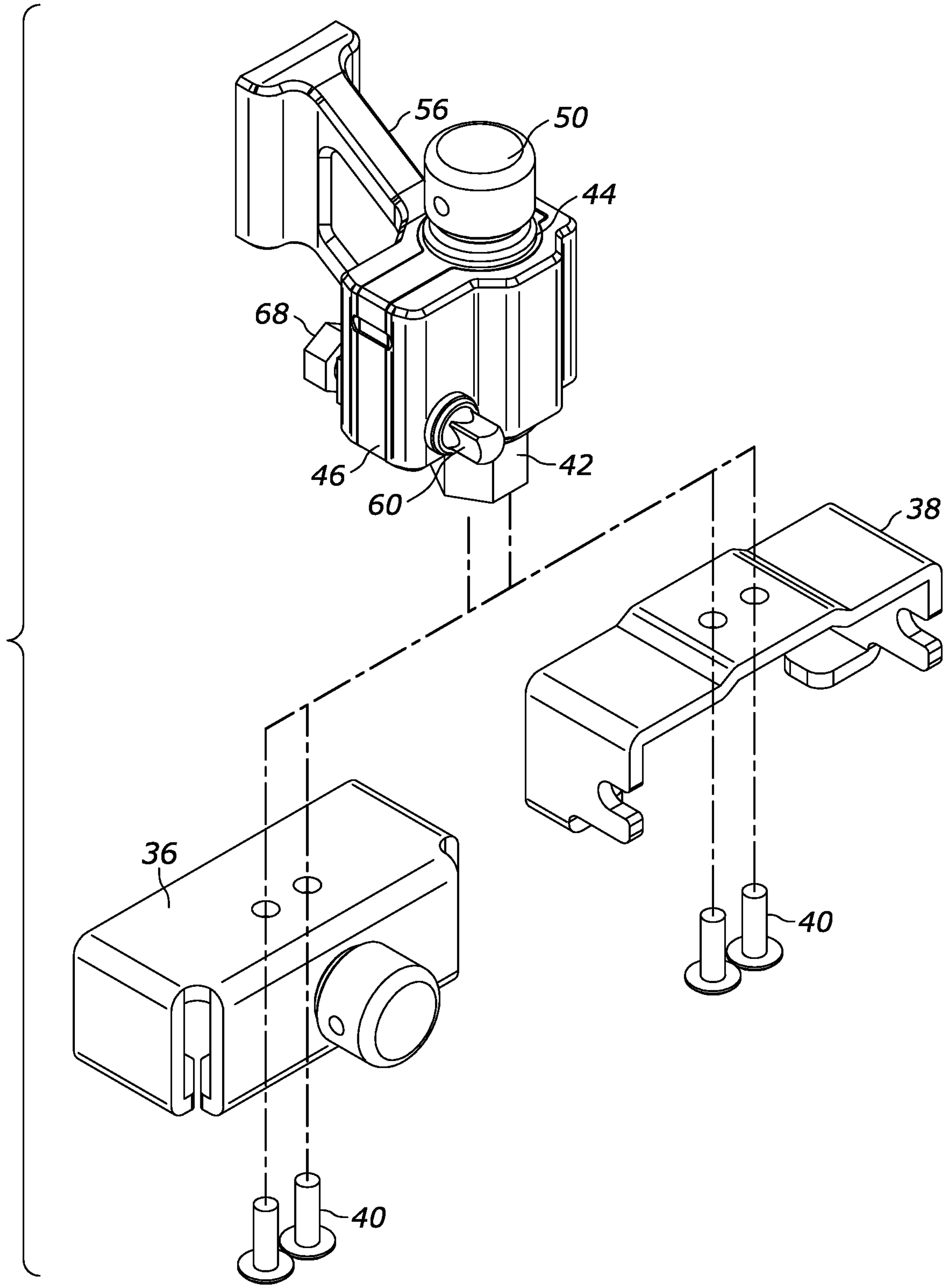
FIG. 7 is an exploded view of a bracket/slider/post structure ready to be coupled to either a snare carrier of the first-side component or a snare carrier of the second-side component in accordance with the embodiment.
Figure 8:
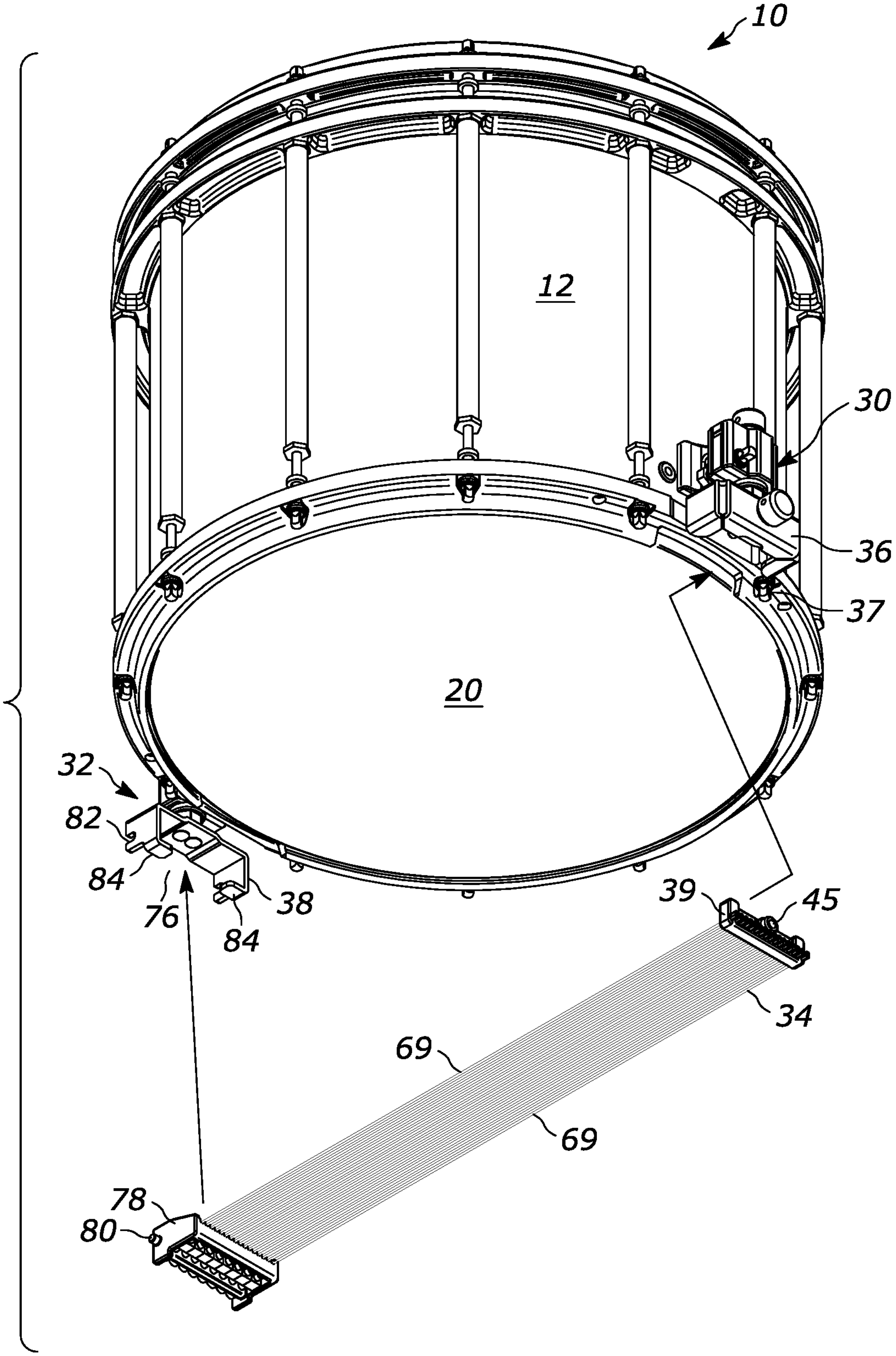
FIG. 8 is an exploded view of a drum with the strainer structure of the embodiment attached thereto and shown ready to receive a snare wire assembly.

With reference to FIGS. 2-4 and 7, the first-side component 30 has a snare carrier 36 fixed via fasteners 40 to a vertical post 42, preferably of hexagonal shape (see FIG. 7). The snare carrier 36 has an opening 37 configured to receive an end 39 of the snare wire assembly 34 (FIG. 8). The snare carrier 36 has associated therewith, a global horizontal cable tension adjustment knob 41 fixed to an end of an adjustment bolt 43, with the other end of the adjustment bolt 43 being threadedly engaged with a threaded bore 45 in the end 39 of the snare wire assembly 34. The end 39 of the snare wire assembly 34 can be completely removed from the snare carrier 36 by turning the knob 41 to completely disengaged the threaded engagement of the adjustment bolt 43 with the end 39 of the snare wire assembly.

Figure 3:
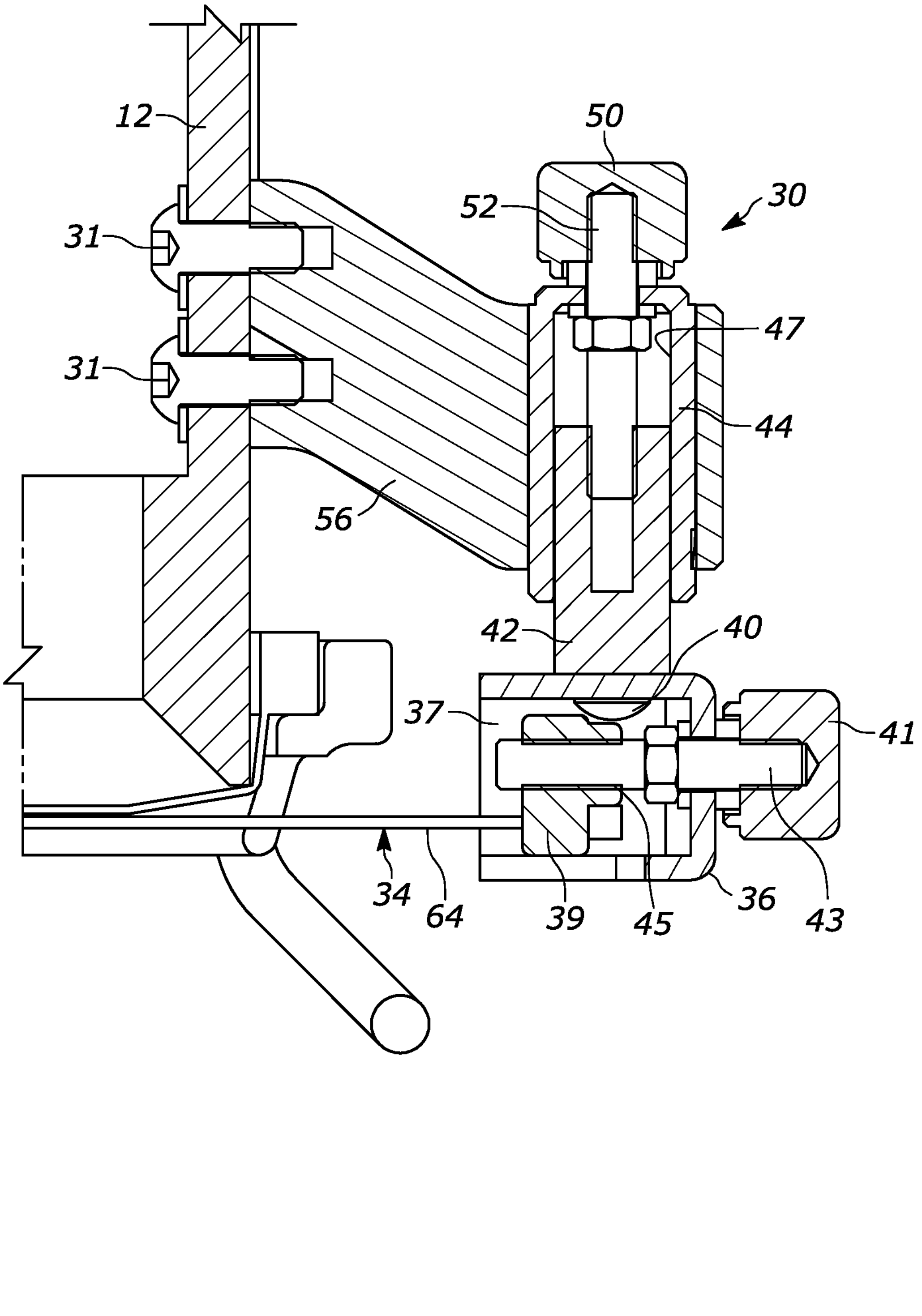
FIG. 3 is a cross-sectional view of the first-side component of FIG. 2 shown coupled to a drum.
Figure 4:
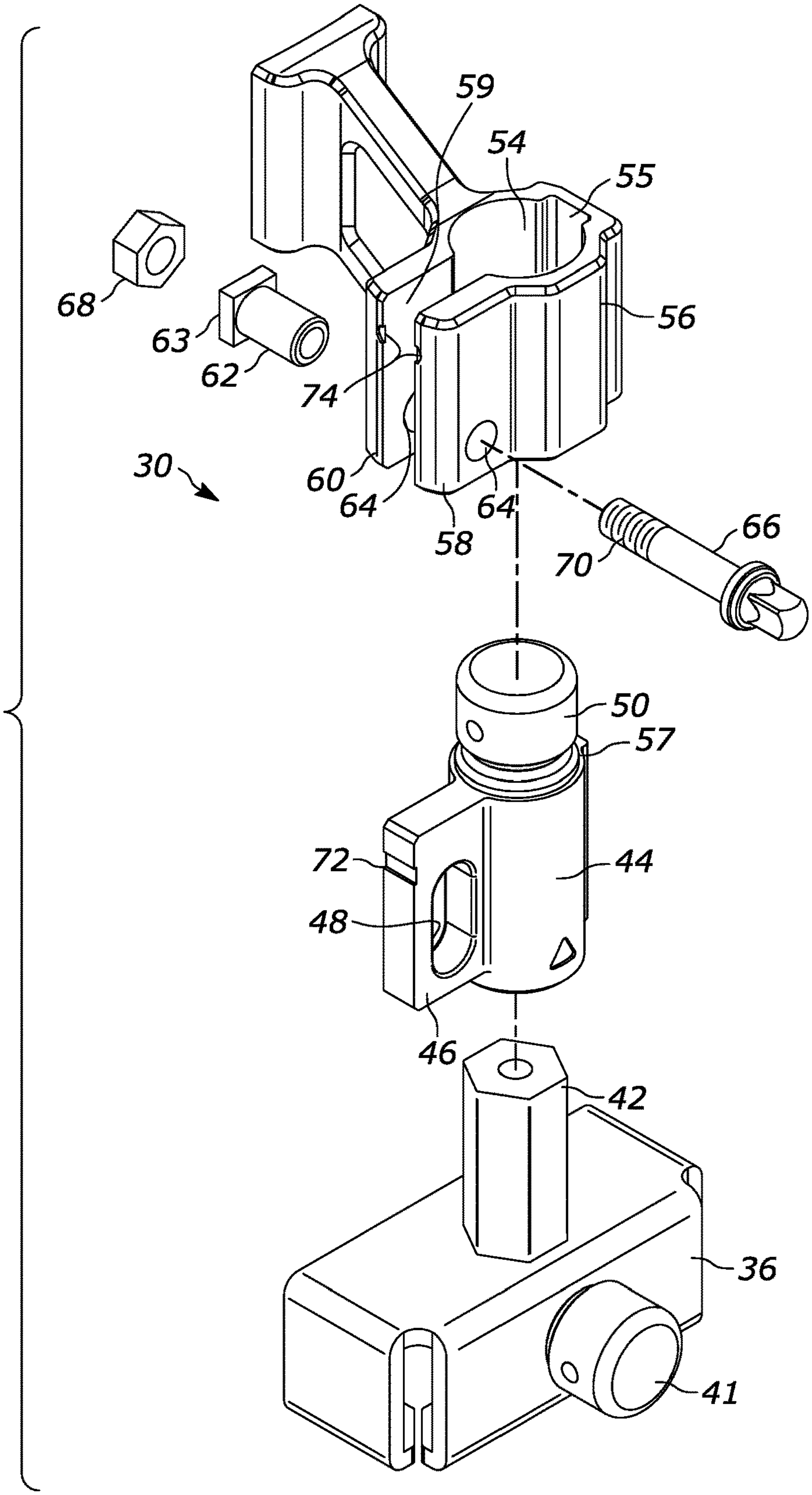
FIG. 4 is an exploded view of the first-side component of FIG. 2.

As best shown in FIGS. 3 and 4, an inner shaft or slider 44 has an internal hexagonally-shaped opening 47 receiving at least a portion of the post 42. Note that conventional shapes other than hexagonal can be employed for the post 42 and opening 47. The slider 44 includes an arm portion 46 have a vertically-extending slot 48 there-through (the function of which will be explained below). The slider 44 also includes a vertical adjustment/tension knob 50 fixed with an adjustment bolt 52 at one end thereof. The other end of the adjustment bolt 52 is threadedly engaged with the post 42 so that the slider 44 can move with the post 42. The bolt 52 can be considered to be part of the adjustment/tension knob 50.

Figure 2:
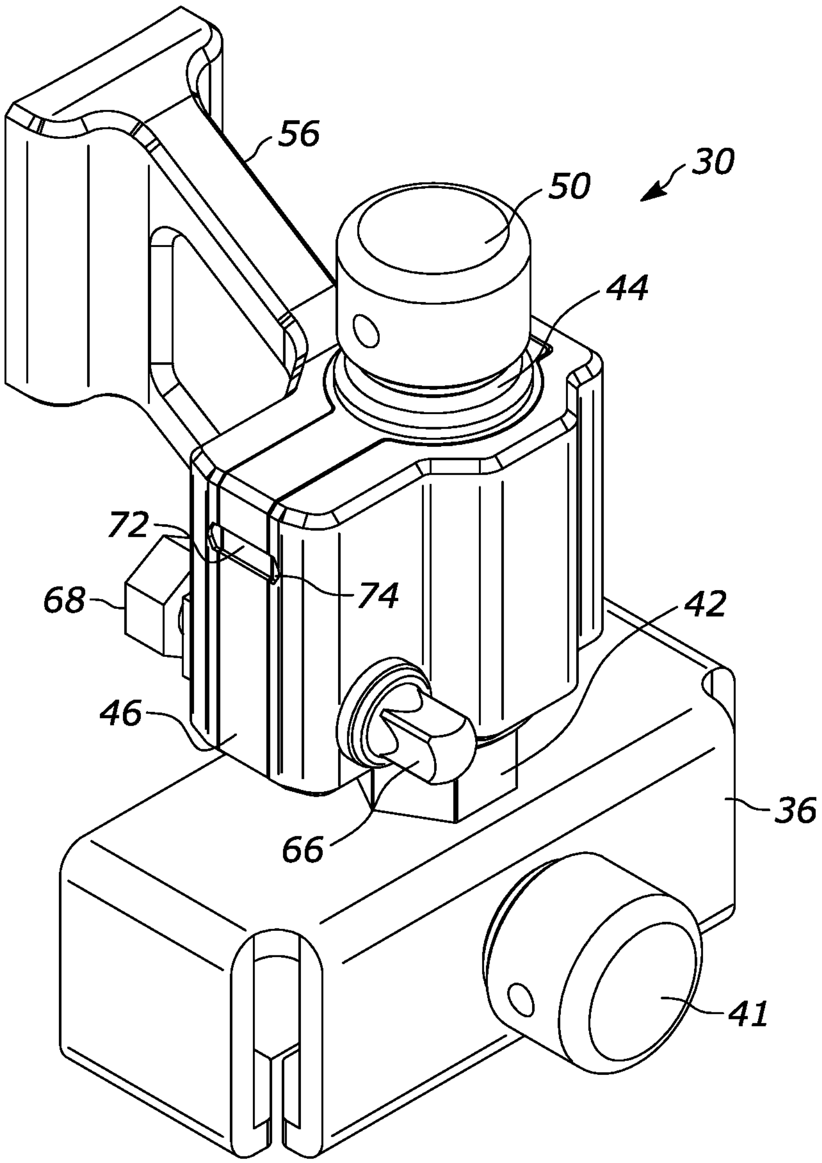
FIG. 2 is a perspective view of a first-side component of the strainer structure according to an exemplary embodiment shown in a snare-ON position.

As best shown in FIGS. 3 and 4, the slider 44 is received in opening 54 in a mounting bracket 56. The opening 54 has a slot 55 that receives a protrusion 57 on the slider 44 to act as a stabilizer and guide vertical movement of the slider 44 in the mounting bracket 56 during use. The mounting bracket 56 is fixed to the drum shell 12 via the fasteners 31. The mounting bracket 56 has first and second portions or arms 58, 60 (FIG. 4) defining a space 59 there-between so as to receive in the space 59, the arm portion 46 of the slider 44. Key bolt structure is provided to releasably secure (clamp) the mounting bracket arms 58, 60 to the arm portion 46 of the slider 44. With reference to FIG. 4, key bolt structure includes an internally threaded bushing 62 disposed in the openings 64 in arm 60 and extending in the into the slot 48 of the slider 44. The bushing 62 has a square end 63 that is received in a generally square recess (not seen) in the mounting bracket 56 so as to prevent rotation of the bushing 62. The key bolt structure includes a key bolt 66 threadedly engaged with the bushing 62 and a lock nut 68 engaged with a threaded end 70 of the key bolt 66. Thus, when the key bolt 66 is tightened by a standard drum key, the mounting bracket arms 58, 60 clamp against the arm portion 46 of the slider 44 to fix the slider 44 with respect to the mounting bracket 56. The key bolt 66 and bushing 62 extend through the slot 58 of the slider 44 and the cylindrical portion of the bushing 62 acts as a stop for vertical movement of the slider 44 by engaging a slot surface when the key bolt 66 is loosened and the slider 44 is moved. Thus, when key bolt 66 is loosened, the slider 44 can move vertically along with snare carrier 36, with respect to the fixed mounting bracket 56. FIGS. 1-3 show the first-side component 30 in an engaged or snare ON position, with the slider 44, post 42 and snare carrier 36 in a first vertical position such that the wires 69 of the snare wire assembly 34 engage the bottom drumhead 20. There is a slider index mark 72 in the arm 46 of the slider 44 and at least one bracket index mark 74 in an arm 58, 60 of the bracket 56 such that when the index marks 72 and 74 are aligned, the alignment indicates to the user the snare ON position of the slider 44 and thus the snare wire assembly 34.

Figure 5:
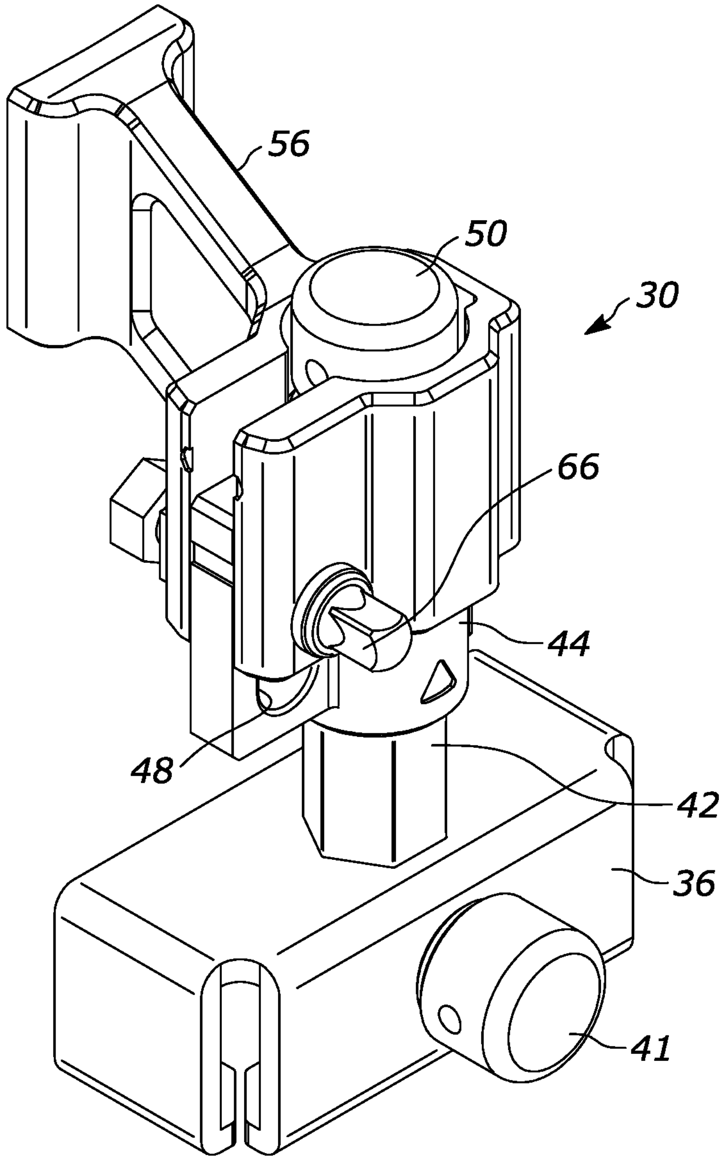
FIG. 5 is a perspective view of the first-side component of the strainer structure according to an exemplary embodiment shown in a snare-OFF position.

With reference to FIGS. 1 and 5, to disengage the wires 69 of the snare wire assembly 34 from engagement with the bottom drumhead 20 (to move the slider 44 of the first-side component to the snare OFF position), the key bolt 66 is loosened using a drum-key and the slider 44 is manually moved downward by engaging the top of the vertical adjustment/tension knob 50 and pushing downwardly. To reengage wires 69 with the bottom drumhead 20 (snare ON position), with the key-bolt 66 loosened, the snare carrier 36 (attached to the slider 44) is manually pushed upwardly until the bushing 62 of the key bolt structure is stopped by the surface of the slot 48 and, once the index marks 72, 74 are aligned, the key-bolt 66 is then tightened (see FIG. 4).

For vertical snare wire tension adjustment and to further raise the wires 69 of the snare wire assembly 34 against the bottom drumhead 20, with key-bolt 66 tightened and the slider 44 in the up or snare ON position (FIG. 2), the vertical adjustment/tension knob 50 is rotated clockwise to adjust the snare carrier 36 upwardly via the threadedly engaged post 42 coupled to snare carrier 36. This presses the wires 69 against the bottom drumhead 20. To slightly lower the wires 69 away from the bottom drumhead 20, the vertical adjustment/tension knob 50 is rotated counter-clockwise to move the snare carrier 36 downwardly. This moves the wires 69 away from the bottom drumhead 20.

As noted above, with reference to FIGS. 2 and 3, the first-side component 36 also includes a global horizontal cable tension adjustment knob 41 associated with the snare carrier 36 and threadedly engaged with end 39 of the snare wire assembly 34. With key-bolt 66 tightened and the slider 44 in the up or snare ON position, the global horizontal cable tension adjustment knob 41 is rotated to a desired horizontal tension of all the wires 69 of the snare wire assembly 34. The knob 41 is turned clockwise to tighten (increase wire tension) or turned counter-clockwise to loosen (decrease wire tension).

Figure 6:
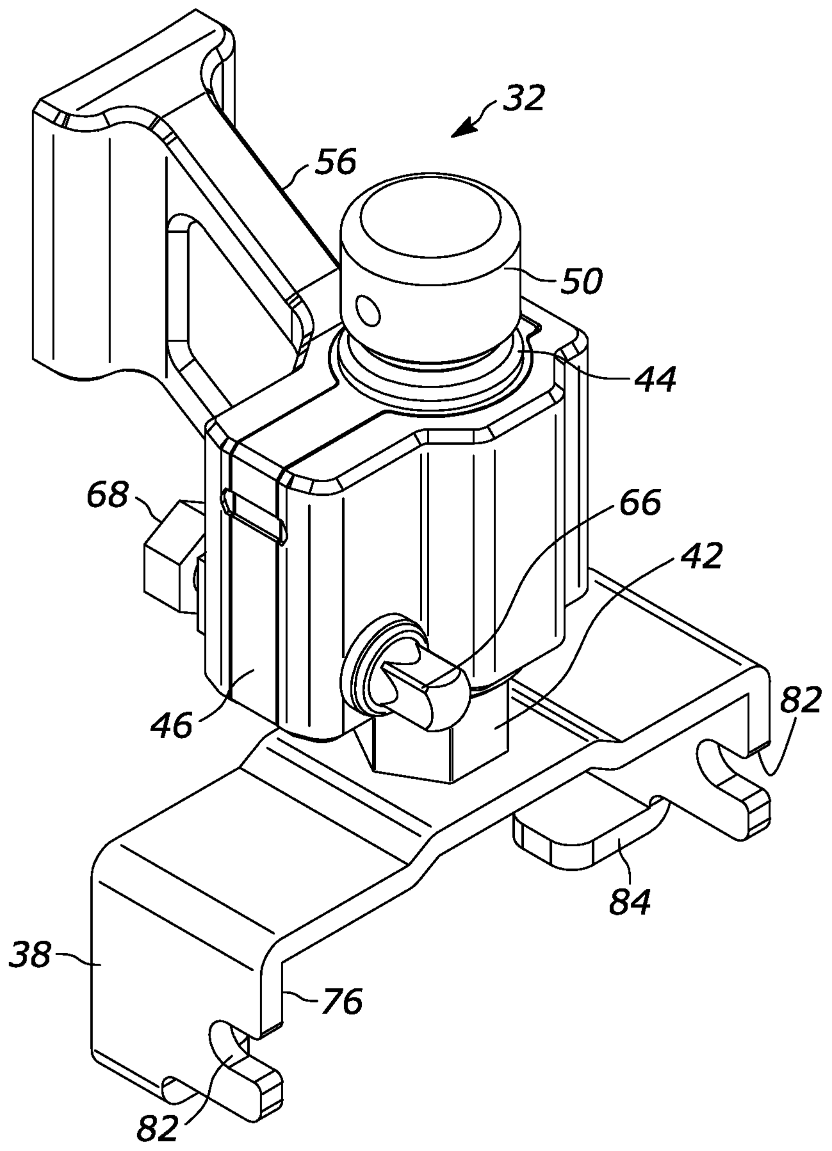
FIG. 6 is a perspective view of a second-side component of the strainer structure according to an exemplary embodiment shown in a snare-ON position.

With reference to FIGS. 1, 6 and 7, the second-side component 32 has structure identical to that of the first-side component 30, but for a different snare carrier 38 that is coupled to the post 42. Snare carrier 38 is generally U-shaped and has an opening 76 there-through configured to receive and house the other end of the snare wire assembly 34 that has a horizontal individual wire tension device 78 (FIG. 8). A pin 80 on each opposing side of the wire tension device 78 is received in an associated slot 82 defined in each side of the snare carrier 38. Tabs 84 of the snare carrier 38 extend into the opening 76 and maintain the wire tension device 78 in the opening 76. The vertical movement of slider 44 to engage (snare ON) or disengage (snare OFF) the wires 69 with drumhead 20 and the vertical snare wire tension adjustment of the second-side component 32 occurs in the same manner described above with regard to the first-side component 30.

For horizontal snare wire tension adjustment at the second-side component 32 so as to adjust individual wire 69 tension, the key-bolt 66 is tightened, the slider 44 is in the up or snare ON position, and the vertical adjustment/tension knob 50 is rotated clockwise until it stops or is set. The user can then adjust each (×16) wire 69 to the desired horizontal tension using a hex-bolt (not shown) by turning the hex-bolt clockwise to tighten (increase individual wire tension) or counter-clockwise to loosen (decrease individual wire tension).

Thus, the strainer structure 28 (including the first and second components 30, 32, respectively) enables vertical movement of the wires 69 towards and away from the bottom drumhead 20 to fully engage or disengage the wires 69. The strainer structure 28 also enables both horizontal and vertical tensioning of the wires 69 when they are engaged with the drumhead 20. The strainer structure 28 advantageously is made with fewer parts (no links/cams/levers) and thus reduces the total weight of a snare drum.

With reference to FIGS. 1 and 7, by having the same slider 44 construction on both sides of the drum 10, the wires 69 can move vertically, while the entire length of the snare wires 69 is kept parallel with the bottom drumhead 20 in the snare OFF position. This construction advantageously makes tuning of wires 69 easier because the wires 69 can be completely separated from drumhead 20. The snare wire assembly 34 can be held securely but easily detached from the carriers 36, 38 of the strainer structure 28.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A snare drum strainer structure for a drum having a bottom drumhead, the strainer structure comprising:

a first-side component comprising:

a first mounting bracket configured to be mounted to one side of a drum shell near the bottom drumhead, a first slider received in an opening in the first mounting bracket for vertical movement with respect to the first mounting bracket, the first slider having a first adjustment/tension knob including a first threaded bolt, the first mounting bracket having a portion configured to clamp on a portion of the first slider, a first key bolt structure configured to releasably cause clamping of the first mounting bracket against the first slider, a first post having a portion received in an internal opening of the first slider and threadedly engaged with the first threaded bolt, and a first snare carrier fixed to the first post;

a snare wire assembly including a plurality of wires extending between first and second ends thereof, the first end being received in the first snare carrier; and a second-side component comprising:

a second mounting bracket configured to be mounted to a side of the drum shell near the bottom drumhead at a location diametrically opposed to the first mounting bracket, a second slider received in an opening in the second mounting bracket for vertical movement with respect to the second mounting bracket, the second slider having a second adjustment/tension knob including a second threaded bolt, the second mounting bracket having a portion configured to clamp on a portion of the second slider, a second key bolt structure configured to releasably cause clamping of the second mounting bracket against the second slider, a second post having a portion received in an internal opening of the second slider and threadedly engaged with the second threaded bolt, and a second snare carrier fixed to the second post, the second end of the snare wire assembly being received in the second snare carrier, wherein when the first side component and the second side component are mounted to the drum shell and with the first and second key bolt structures causing the first and second mounting brackets to clamp on the respective first and second siders, each disposed in a snare ON position with the snare wires pressed against the bottom drumhead, each key bolt structure can be manually rotated to release clamping of the first and second mounting brackets on the respective first and second siders so that each slider can be manually moved downwardly causing the wires to move away from the bottom drumhead to a snare OFF position, whereby an entire length of the wires can be kept parallel with the bottom drumhead in the snare OFF position.

2. The strainer structure of claim 1, wherein in the snare ON position of the sliders, each of the first and second adjustment/tension knobs are configured 1) to be manually rotated in a first direction to adjust the associated snare carrier upwardly via the threadedly engaged post coupled to the associated snare carrier to adjust vertical tension of the wires pressed against the bottom drumhead, and 2) to be manually rotated in a direction opposite the one direction to adjust the associated snare carrier downwardly to move the wires away from the bottom drumhead.

3. The strainer structure of claim 1, wherein from the snare OFF position, to reengage the wires with the bottom drumhead, with the key-bolt loosened, each snare carrier attached to the associate slider is configured to be manually moved upwardly to the snare ON position.

4. The strainer structure of claim 1, wherein the first snare carrier has associated therewith, a global horizontal cable tension adjustment knob fixed to an end of an adjustment bolt, with another end of the adjustment bolt being threadedly engaged with a threaded bore in the first end of the snare wire assembly.

5. The strainer structure of claim 4, wherein in the snare ON position of the sliders, the global horizontal cable tension adjustment knob is configured to be manually rotated to adjust a horizontal tension of all the wires of the snare wire assembly.

6. The strainer structure of claim 1, wherein the second snare carrier is generally U-shaped and has an opening there-through receiving and housing the second end of the snare wire assembly that includes a horizontal individual wire tension device, a pin on each opposing side of the wire tension device is received in an associated slot defined in each side of the second snare carrier, tabs of the second snare carrier extend into the opening and maintain the wire tension device in the opening.

7. The strainer structure of claim 6, wherein in the snare ON position of the sliders, the wire tension device is configured to enable individual horizontal tension of each of the wires.

8. The strainer structure of claim 1, wherein the portion of each of the first and second mounting brackets includes a pair of arms defining a space there-between, and the portion of each of the sliders is an arm disposed in the space.

9. The strainer structure of claim 8, wherein each pair of arms of each first and second mounting bracket includes axially aligned openings there-through, and each arm of each slider has a vertically-extending slot there-through, and wherein each key bolt structure comprises: an internally threaded bushing disposed in at least one of the openings in an arm of an associated mounting bracket; a key bolt threadedly engaged with the bushing; and a lock nut engaged with a threaded end of the key bolt, wherein the key bolt is configured to be manually rotated to cause clamping and unclamping of the pair of arms with respect to the arm of the associated slider permitting adjustment, via the slot, of a vertical location of the slider with respect to the mounting bracket.

10. The strainer structure of claim 9, wherein each bushing has a square end that is received in a generally square recess in an associated mounting bracket so as to prevent rotation of the bushing, and wherein the bushing has a cylindrical portion that is configured to act a stop of vertical movement of the slider upon engaging a surface of the slot.

11. The strainer structure of claim 9, wherein the arm of each of the first and second sliders includes a slider index mark and at least one arm of an associated mounting bracket includes a bracket index mark such that when the slider index mark and bracket index mark are aligned, the alignment indicates to a user, the snare ON position.

12. The strainer structure of claim 1, wherein each post is of hexagonal shape and the internal opening of the associated slider is of hexagonal shape.

13. A strainer for a snare drum having a bottom drumhead, the strainer comprising:

a mounting bracket configured to be mounted to a side of a drum shell near the bottom drumhead, a slider received in an opening in the mounting bracket for vertical movement with respect to the mounting bracket, the slider having an adjustment/tension knob including a threaded bolt, the mounting bracket having a portion configured to clamp on a portion of the slider, a key bolt structure configured to releasably cause clamping of the mounting bracket against the slider, a post having a portion received in an internal opening of the slider threadedly engaged with the bolt, and a snare carrier fixed to the post, the snare carrier being configured to receive and carry an end of a snare wire assembly, whereby, when the key bolt structure is released and when the snare wire assembly is coupled to the snare carrier, the sider is configured to be manually moved vertically between 1) a snare ON position, such that wires of the snare wire assembly can engage with the bottom drumhead and 2) a snare OFF position such that the wires of the snare wire assembly can disengage with the bottom drumhead.

14. The strainer structure of claim 13, wherein the snare carrier has associated therewith, a rotatable global horizontal cable tension adjustment knob fixed to an end of an adjustment bolt, another end of the adjustment bolt being configured to threadedly engage with a threaded bore in an end of the snare wire assembly.

15. The strainer structure of claim 13, wherein the snare carrier is generally U-shaped and has an opening there-through configured to receive and house an end of the snare wire assembly that includes a horizontal individual wire tension device, the snare carrier includes a slot defined in each side thereof configured to receive a pin on each opposing side of the wire tension device, the snare carrier including tabs extending into the opening and configured to maintain the wire tension device in the opening.

16. The strainer structure of claim 13, wherein the portion of each of the mounting bracket includes a pair of arms defining a space there-between, and the portion of slider is an arm disposed in the space.

17. The strainer structure of claim 16, wherein the pair of arms includes axially aligned openings there-through, and the arm of the slider has a vertically-extending slot there-through, and wherein the key bolt structure comprises: an internally threaded bushing disposed in at least one of the openings in an arm of the mounting bracket; a key bolt threadedly engaged with the bushing; and a lock nut engaged with a threaded end of the key bolt, wherein the key bolt is configured to be rotated to cause clamping and unclamping of the pair of arms with respect to the arm of the slider permitting adjustment, via the slot, of a vertical location of the slider with respect to the mounting bracket.

18. The strainer structure of claim 17, wherein the bushing has a square end that is received in a generally square recess in the mounting bracket so as to prevent rotation of the bushing and wherein the bushing has a cylindrical portion that is configured to act a stop of vertical movement of the slider upon engaging a surface of the slot.

19. The strainer structure of claim 17, wherein the arm of the slider includes a slider index mark and at least one arm of the mounting bracket includes a bracket index mark such that when the slider index mark and bracket index mark are aligned, the alignment indicates to a user, a certain position of the slider.

20. The strainer structure of claim 13, wherein each post is of hexagonal shape and the internal opening of the associated slider is of hexagonal shape.

* * * * *